United States Patent [19]
Olson et al.

[11] Patent Number: 5,628,527
[45] Date of Patent: May 13, 1997

[54] COVER/DIRECTOR FOR AIR BAG

[75] Inventors: Brent K. Olson, Clearfield; J. Kirk Storey, Farmington, both of Utah

[73] Assignee: Morton International, Inc., Chicago, Ill.

[21] Appl. No.: 591,054

[22] Filed: Jan. 25, 1996

[51] Int. Cl.$^6$ .................................................. B60R 21/22
[52] U.S. Cl. ................................ 280/730.2; 280/728.1
[58] Field of Search ........................... 280/728.1, 728.2, 280/730.1, 730.2, 733, 743.1

[56] References Cited

U.S. PATENT DOCUMENTS

| | | | |
|---|---|---|---|
| 4,348,037 | 9/1982 | Law et al. | 280/733 |
| 5,364,124 | 11/1994 | Donegan et al. | 280/730.1 |
| 5,441,299 | 8/1995 | Lauritzen et al. | 280/728.2 |
| 5,498,030 | 3/1996 | Hill et al. | 280/728.2 |
| 5,547,214 | 8/1996 | Zimmerman et al. | 280/730.2 |

*Primary Examiner*—Paul N. Dickson
*Attorney, Agent, or Firm*—Lawrence I. Field; Gerald K. White

[57] ABSTRACT

An undeployed air bag and inflator are wrapped in a soft cloth package. At the time the air bag is inflated, a seam in the cloth ruptures and a portion of the package unfolds to form a guide for the deploying air bag. The package also includes means to secure it to a portion of a vehicle such as a seat back.

4 Claims, 3 Drawing Sheets

U.S. Patent May 13, 1997 Sheet 1 of 3 5,628,527
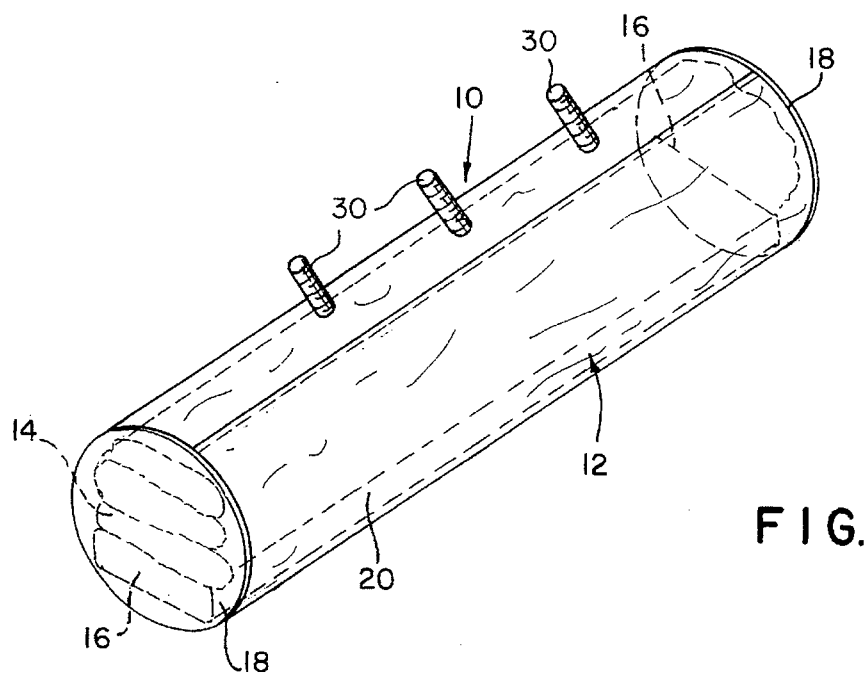
FIG. 1
FIG. 2
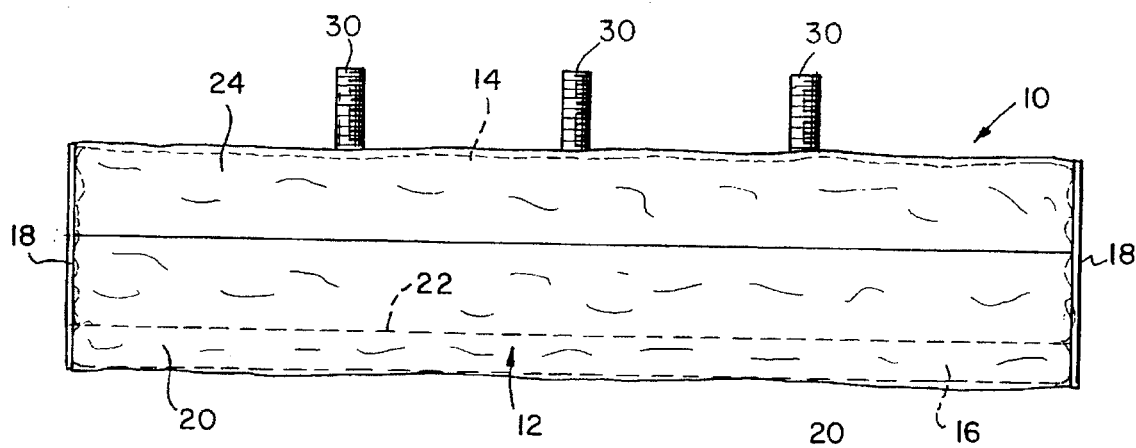
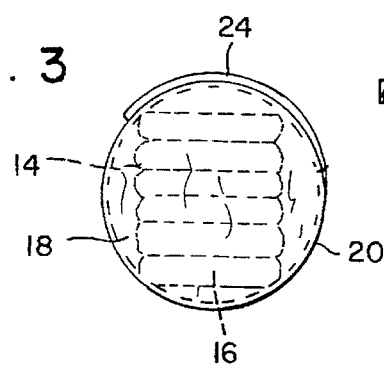
FIG. 3
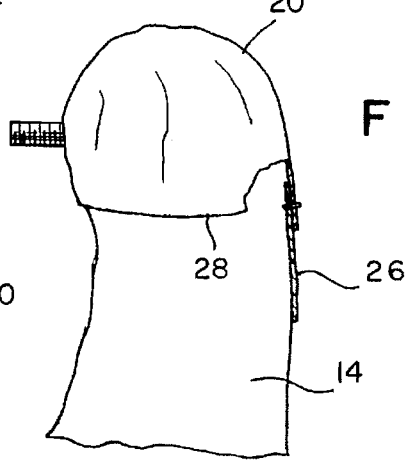
FIG. 4

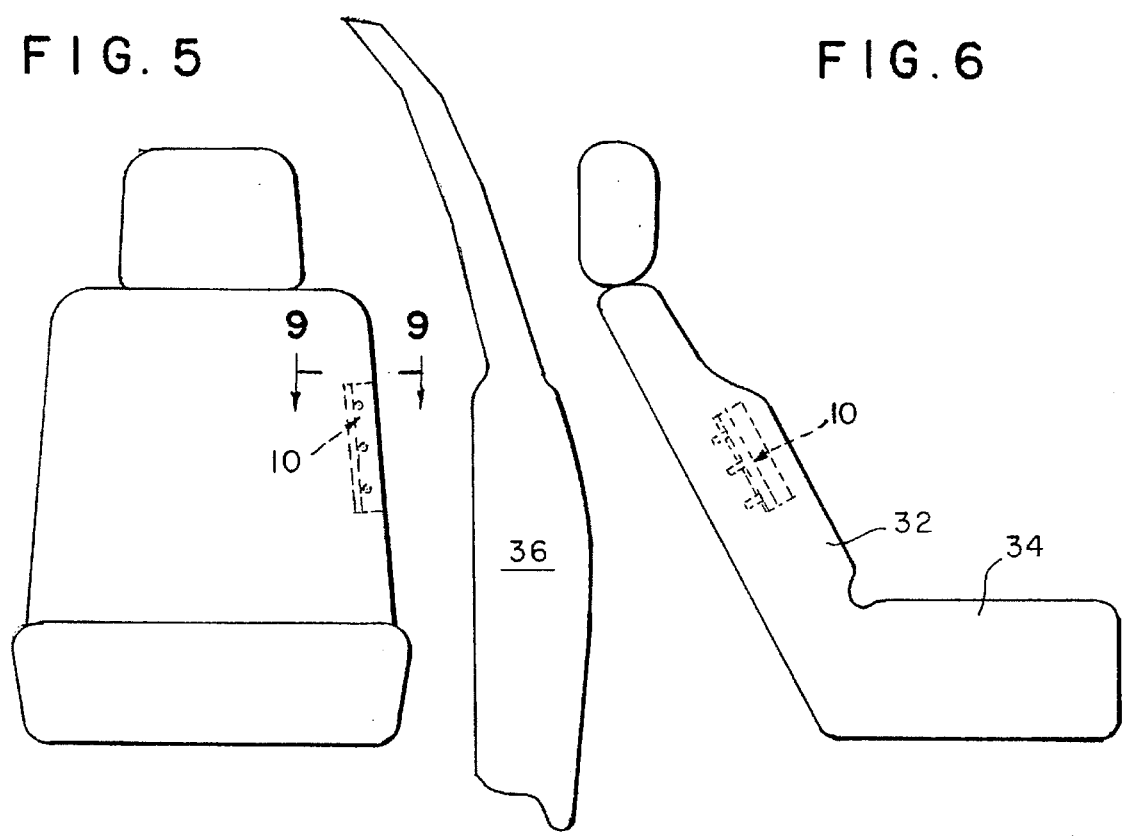
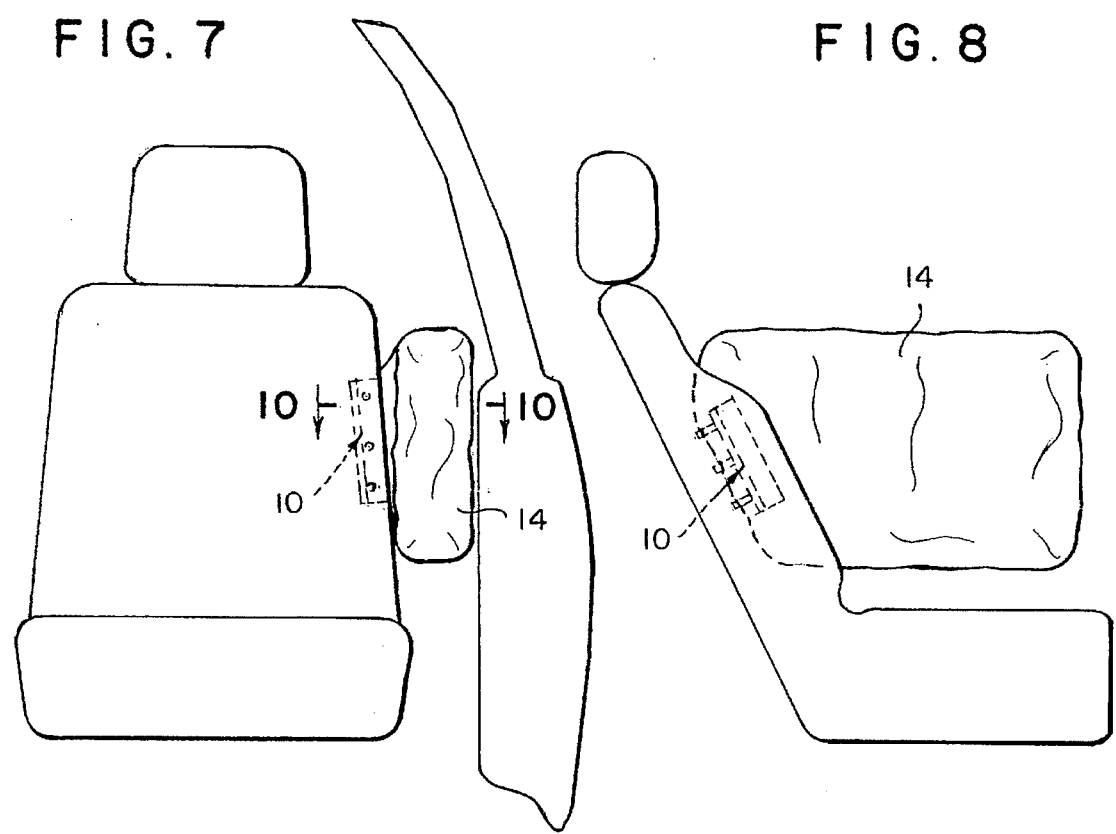

FRONT OF VEHICLE

COVER/DIRECTOR FOR AIR BAG

This invention relates to an airbag enclosed in a soft packaging material such as cloth or Tyvek paper. More particularly, it relates to an airbag and inflator enclosed in cloth or paper which may be positioned at any desired location in an automobile and from which an air bag may be deployed in a preferred direction in order to protect the occupant of the vehicle in the event of a collision or crash.

As described in our U.S. Pat. No. 5,324,072 and in many other known air bag installations, an air bag has been disposed inside a metal canister or a plastic housing with an opening through which the air bag deploys. The opening is usually covered by a decorative cover which may form part of the dashboard of the vehicle. Even when the cover is "soft" as the foam in Hill, U.S. Pat. No. 5,308,112, it can injure an occupant if it is ejected toward the occupant as the air bag unfurls.

In the soft pack design of the present invention, the air bag is enclosed in a soft packaging material and deployment director as part of the package. In many seat mounted side impact installations, the cushion's initial deployment direction is toward the inner trim of the vehicle. It is more desirable that the initial direction of deployment be toward the front of the vehicle. Hence, there is a need for directional deployment.

The device of this invention acts as a cover for the air bag before the air bag is deployed and during deployment the device acts as a guide for the deploying air bag. Since the device can be made of cloth, it well suited for the soft pack designs of the present invention. This allows for greater flexibility in packaging the module since all directional concerns are resolved.

OBJECTS OF THE INVENTION

One object of the present invention is to provide a cover for an air bag which is soft and which will cause the air bag to deploy in a desired direction.

Another object of the invention is to provide an air bag package which can be mounted anywhere in the vehicle so that the air bag affords protection to specific portions of the occupant of the vehicle when it deploys.

A further object of the invention is to provide a cover for a folded, unfurled air bag cushion which keeps out foreign objects and which maintains the bag in readiness for deployment.

Still another object of the invention is to provide an undeployed air bag in a wrapping which tears along a seam which is weakened to promote opening of the wrapping in a specific manner and deployment of the air bag in a given direction.

BRIEF DESCRIPTION OF THE DRAWINGS

These and other objects of the invention will be pointed out or will become apparent from the description which follows taken in connection with the drawings showing preferred embodiments of the invention in which:

FIG. 1 is a view in perspective of the soft pack of this invention; before deployment;

FIG. 2 is a side view of the pack of FIG. 1;

FIG. 3 is an end view of the pack of FIG. 1;

FIG. 4 is an end view showing the pack open;

FIG. 5 is a view showing the pack of FIG. 1 mounted on a seat back, before deployment;

FIG. 6 is a side view of FIG. 5;

FIG. 7 is a view like FIG. 6 after deployment of the air bag;

FIG. 8 is a side view of FIG. 7;

As shown in FIGS. 1 and 2 the air bag package 10 is cylindrical in shape. A typical package will be approximately 7 inches long and 3–4 inches in diameter. The package 10 comprises a cover 12, an undeployed folded air bag 14 and means 16 to inflate the air bag.

Figure 9:
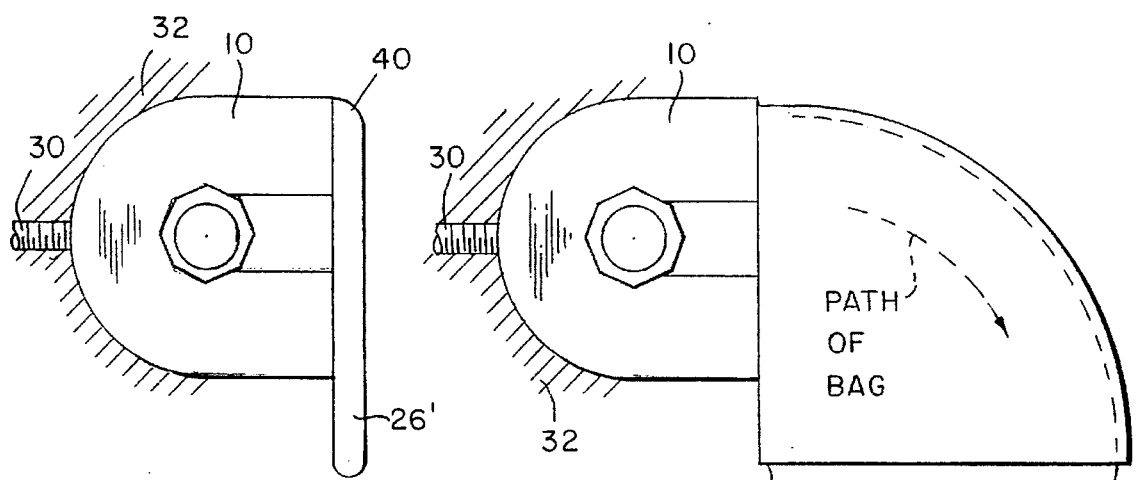
FIG. 9 is a more detailed view of a modified soft pack before deployment.

The air bag cover 12 is cloth or it may be formed from Tyvek paper. Cover 12 may be produced by joining a rectangular body piece 20 to two end pieces 18. End pieces may be circular, as preferred, or oval or even polygonal, depending to some extent in where the package is to be mounted in a vehicle and how the bag is to be deployed, i.e. in what direction it is desired that the bag move as it unfolds. Inside the air bag cover 12 are a folded air bag 14 and an inflator 16. The rectangular body piece 20 is sufficiently long that when it is wrapped around the folded air bag and inflator, a portion 24 overlaps and is doubled as shown in FIG. 3. A seam 22 of weakened construction extends the length of the cover so that at the time of deployment the package breaks open to permit the air bag to exit from the cover 12 and to unfold in a given direction. The body 20 and ends 18 are joined by sewing or by adhesive. The package is assembled by inserting a folded air bag and inflator into the cover 12, or by wrapping the cover around the air bag cushion and inflator and then closing it by sewing. When the inflator inflates the air bag, seam 22 is fractured and the doubled, overlapped portion 24 of the cover 12 unwraps to form a guide 26 to direct deployment of the cushion in a desired direction. Guide 26 extends approximately tangentially from the pack 10 and as it unfurls from the remainder of cover 12, a mouth 28 is formed through which the air bag deploys.

It will be seen that the soft cover of the present invention directs the deployment of the cushion in much the same manner as prior art cover doors, which still providing the benefits of a soft pack rather than a hard pack.

The pack of FIG. 1 includes studs 30 by means of which it is secured to a seat back 32 in a seat 34 adjacent to a vehicle door or body 36. The air bag deploys from the pack in a forward direction between the vehicle body 36 and the passenger.

FIG. 5 shows the pack of FIG. 1 mounted on a car seat 32 by inserting studs 30 into the frame (not shown) of the car seat. One side of the vehicle body 36 is shown in FIG. 5.

Upon inflation of the cushion 14, by the inflator 16, the air bag cushion 14 deploys as shown in FIG. 7, between the side 36 of the car and the car seat 32. As shown in FIG. 8, the air bag cushion is caused to deploy in a forward direction so that the occupant of the vehicle is protected against a side impact collision.

Figure 10:
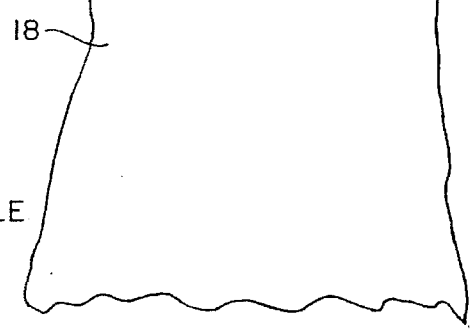
FIG. 10 is a view of the pack of FIG. 9 after deployment.

As shown in FIGS. 9 and 10; a soft pack 10 is mounted in a seat back 32 by means of studs 30. The cover of the soft pack includes a stiffened portion 26' which is either an extension of the cover 12 or a separate piece attached to one edge of the rectangular piece of cloth 20 of which the cover is formed. When the air bag begins to deploy, the stiffened portion 26' is pushed away from the seat back and forms a means for deflecting the air bag cushion toward the front of the vehicle between the passenger and the vehicle body. A hinge 40 may be provided between the cloth or paper portion 26' and the soft pack cover 12.

Having now described preferred embodiments of the invention it is not intended that it be limited except as may be required by the appended claims.

We claim:

1. A soft air bag package mounted in a vehicle seat back comprising:

a folded air bag cushion, a soft wrapping of cloth or Tyvek paper enclosing said air bag cushion, and a weakened seam in said wrapping, said wrapping including a cover portion which encloses said air bag cushion and which overlaps a portion of said wrapping and which extends tangentially to said wrapping when said weakened seam opens for deployment of said air bag cushion whereby said cushion is caused to deploy forwardly in a vehicle along an interior surface of said cover portion.

2. The package of claim 1 in which the wrapping is substantially cylindrical and said cover portion includes an overlapping outer portion which overlaps a portion of the cylindrical wrapping.

3. The package of claim 2 in which an extension is secured to a free edge of said overlapping outer portion.

4. A method of deploying an air bag cushion in a forward direction including mounting the package of claim 1 in a seat back with the weakened seam disposed on a portion of the wrapping which faces the front of a vehicle.

* * * * *